US006829216B1

(12) United States Patent
Nakata

(10) Patent No.: US 6,829,216 B1
(45) Date of Patent: Dec. 7, 2004

(54) METHOD AND SYSTEM FOR DESIGNING A NETWORK

(75) Inventor: Tsuneo Nakata, Richardson, TX (US)

(73) Assignee: Hitachi Telecom (U.S.A.), Inc., Norcross, GA (US)

( * ) Notice: Subject to any disclaimer, the term of this patent is extended or adjusted under 35 U.S.C. 154(b) by 735 days.

(21) Appl. No.: 09/642,070

(22) Filed: Aug. 18, 2000

(51) Int. Cl.[7] .............................. H04J 3/02; H04J 14/00
(52) U.S. Cl. ....................... 370/228; 370/254; 370/406; 398/5; 398/58; 709/221
(58) Field of Search .................................... 370/216, 225, 370/228, 254, 255, 351, 386, 400, 406; 398/1, 2, 5, 48, 49, 58, 66, 68; 709/220, 221, 238, 239; 714/1, 2, 3, 4

(56) References Cited

U.S. PATENT DOCUMENTS

| | | | |
|---|---|---|---|
| 5,170,482 A | * 12/1992 | Shu et al. ...................... | 712/12 |
| 5,297,137 A | * 3/1994 | Ofek et al. .................. | 370/403 |
| 5,533,016 A | * 7/1996 | Cook et al. .................. | 370/351 |
| 6,108,311 A | * 8/2000 | Ramaswami et al. ....... | 370/258 |
| 6,122,283 A | * 9/2000 | Lee ............................. | 370/408 |
| 6,331,905 B1 | * 12/2001 | Ellinas et al. .................. | 398/2 |
| 6,646,989 B1 | * 11/2003 | Khotimsky et al. ......... | 370/238 |

OTHER PUBLICATIONS

A. Kershenbaum, et al.; "Mentor: An Algorithm for Mesh Network Topological Optimization and Routing;" *IEEE Transactions on Communications*, vol. 39, No. 4; pp. 503–513, Apr. 1991.

H. Harai, et al.; "Topological Design of WDM Networks for Accommodating Wavelength Paths;" *Technical Report of IEICE*; pp. 13–18.

J. Fingerhut, et al.; "Designing Minimum Cost Nonblocking Communication Networks;" Washington University Department of Computer Science; WUCS–96–06; all, Feb. 5, 1996.

G. Li, et al.; "The Partition Coloring Problem and its Application to Wavelength Routing and Assignment;" College of William and Mary Department of Computer Science; all.

D. Hochbaum; "Approximation Algorithms for NP–Hard Problems;" PWS Publishing Company, pp. 94–143, 1995.

D. Kreher, et al.; "Combinatorial Algorithms: Generation, Enumeration, and Search;" CRC Press; pp. 105–145, 1998.

D. Bertsekas; "Network Optimization: Continuous and Discrete Models;" pp. 467–511, 1998.

R. Cahn; "Wide Area Network Design;" Morgan Kaufmann Publishers; pp. 205–265, 1998.

* cited by examiner

*Primary Examiner*—Alpus H. Hsu
(74) *Attorney, Agent, or Firm*—Baker Botts L.L.P.

(57) ABSTRACT

A method and system for designing a network includes generating a representation of a candidate network. The representation includes vertices and edges, where each vertex represents a path and each edge couples at least two vertices representing paths of which at most one path can be included in a network. A set of a maximum number of vertices, where no two vertices are coupled by an edge, is determined. The paths represented by the vertices of the set are included in the network.

33 Claims, 8 Drawing Sheets

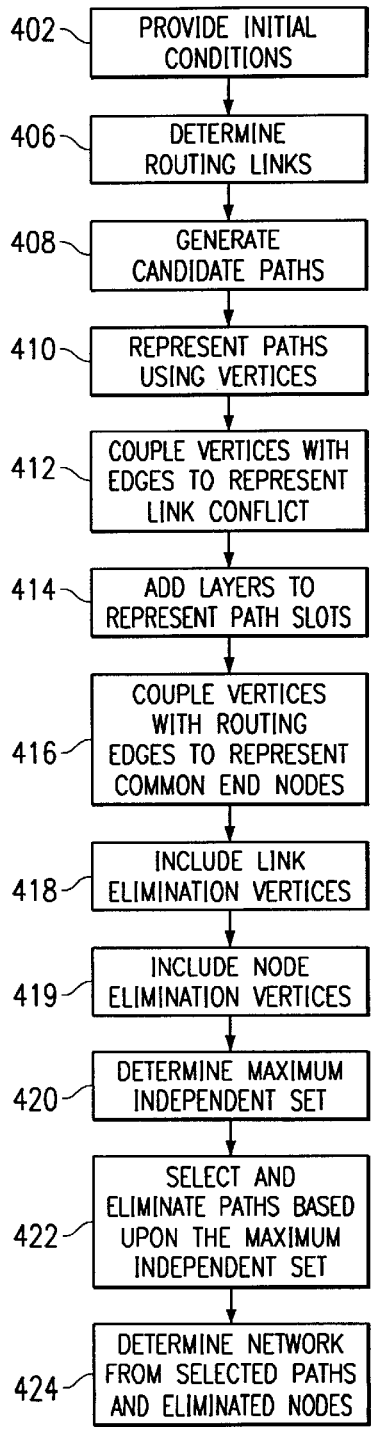
FIG. 6
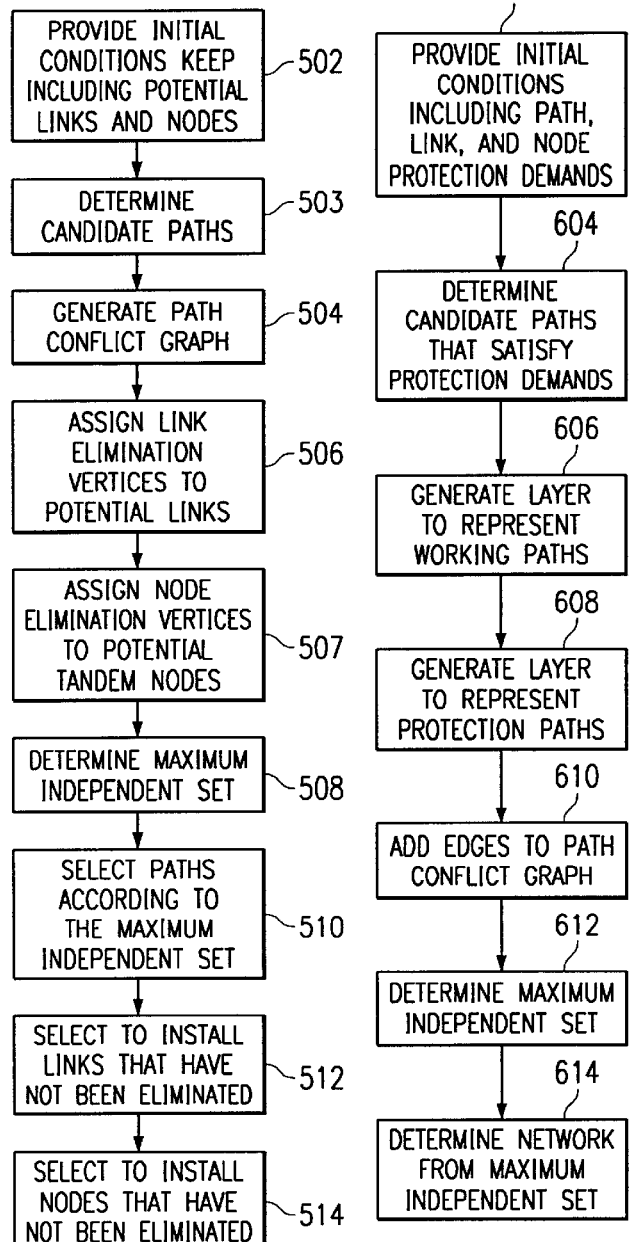
FIG. 7
FIG. 8

US 6,829,216 B1

METHOD AND SYSTEM FOR DESIGNING A NETWORK

TECHNICAL FIELD OF THE INVENTION

This invention relates generally to the field of telecommunications and more specifically to a method and system for designing a network.

BACKGROUND OF THE INVENTION

Telecommunications networks allow parties and systems at different locations to communicate with each other. A network includes an arrangement of nodes and links. The nodes serve as points of contact into the network and perform switching, control, and other functions of the network. The links provide communication between the nodes. Data travels along paths that include the links and nodes.

Known methods for network design include exhaustive methods and tree-finding methods. Exhaustive methods generate multiple routing assignments for the paths, individually check the routing assignments for optimal assignments, and select a routing assignment. These methods, however, are generally inefficient and slow. Tree-finding methods utilize heuristics to select a tree representing a network and then attempt to adjust the tree to satisfy network demands. These methods, however, typically fail to provide optimal solutions that satisfy network demands.

SUMMARY OF THE INVENTION

In accordance with the present invention, a method and system for designing a network are provided that substantially eliminate or reduce the disadvantages and problems associated with previous systems and methods.

According to one embodiment of the present invention, a method and system for designing a network includes generating a representation of a candidate network. The representation includes vertices and edges, where each vertex represents a path. Each edge couples at least two vertices representing paths of which only one path can included in a network. A set of a maximum number of vertices, where no two vertices are coupled by an edge, is determined. The paths represented by the vertices of the set are included in the network.

Technical advantages of the present invention include providing an improved method and system for designing networks. In a particular embodiment, network demands are represented to design an optimized network. The optimized network meets the network demands while using minimal node and link resources. Other embodiments of the invention may provide additional technical advantages. In one embodiment, an improved method and system for upgrading an existing network to meet new network demands are provided. In the embodiment, existing resources are fixed in the representation, while candidate resources are added if selected.

Another technical advantage of one embodiment is a method and system for designing a network that satisfies path protection demands are provided. In the embodiment, a representation of the candidate network represents both working and protection paths. An optimized arrangement of the working and protection paths are determined from the representation.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 6 is a flowchart of a method for designing a network using the candidate network of FIG. 4B;

FIG. 7 is a flowchart illustrating one embodiment of a method for upgrading the candidate network of FIG. 4C; and FIG. 8 is a flowchart illustrating a method for including protection paths in a network designed using the candidate network of FIG. 4D.

DETAILED DESCRIPTION OF THE DRAWINGS

Figure 1:
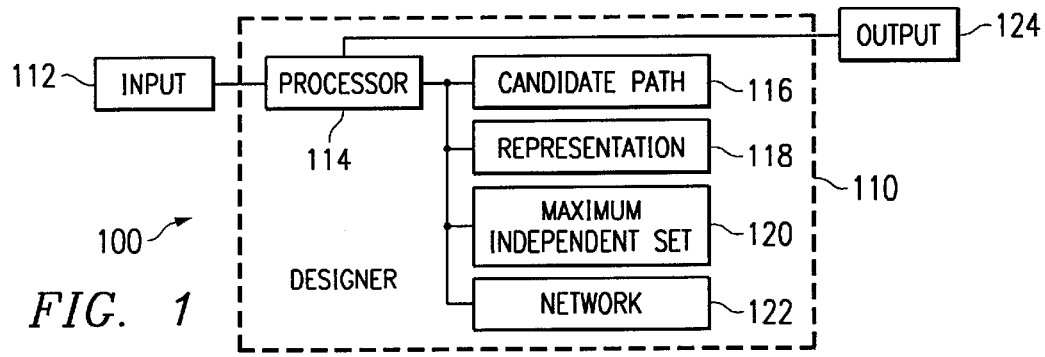
FIG. 1 is a block diagram of one embodiment of a system for designing a network according to the present invention.

FIG. 1 is a block diagram of one embodiment of a system 100 for designing a network. The network communicates data and/or voice between remote parties and/or systems, and may include, for example, a long distance network, a local area network, a metropolitan area network, and/or any other suitable network or combination of networks that allow for communication between parties and systems. The network typically includes resources such as nodes and links. A node includes a point of connection into a network through which a party communicates. A node may include, for example, a polled unit of a multipoint network, a device on a local area network ring, a packet switch of a packet switch network, or other suitable point of connection to a network. A link includes a physical communication channel between at least two nodes.

In one embodiment, the network includes an optical network, such as a wavelength division multiplexing (WDM) network, that includes optical fiber for transmitting signals. A WDM link includes an optical fiber connection with a wavelength multiplexer at the origin node and a wavelength demultiplexer at the destination node. An optical network may have optical and/or electrical switching devices.

As described in more detail below, system 100 receives initial conditions for a network and designs a network that satisfies the initial conditions. The network includes an arrangement of nodes, links, and paths of the network. A path, which includes nodes and links, is a route on which data travels through a network.

Referring to FIG. 1, an input 112 receives the initial conditions for a network. Input 112 may include a keyboard, a mouse, port, or any suitable device that receives input and transmits the input to designer module 110. Initial conditions may include demand links and routing links. Demand links describe the demands that the network must satisfy. A demand link from one node to another node represents the demand that data must be communicated between these two nodes. Routing links are links that may be used to satisfy the demand links. Routing links may be fixed or candidate links. Fixed links are links that are required to be included in the network, for example, existing links. Candidate links are links that potentially may be added to or may be eliminated from the network.

The initial conditions may also include candidate paths or conditions for generating candidate paths. Candidate paths are paths that may be used to satisfy the demand links. Conditions for generating candidate paths may include, for example, links and/or nodes that may be used in the candidate paths and a maximum number of links per candidate path. Initial conditions may also specify the number of slots per path available to carry traffic and/or path protection requirements. Input 112 transmits the received information to designer module 110.

Designer module 110 includes a processor 114 that processes the input information in order to generate a network that satisfies the network demands. A candidate path module 116 stores the candidate paths, and may be used to generate candidate paths given the initial conditions for the network.

A representation module 118 generates a path conflict graph representation from the candidate paths. In the representation, vertices represent candidate paths, and edges couple the vertices. At most one path represented by vertices coupled by an edge may be included in a network. Examples of paths that are not all included in a network include paths that share the same resource, that is, paths that have a conflicting resource, where the resource is limited to one path. Paths that satisfy the same demand, where only one path is needed to satisfy the demand, also examples of paths that are not all included in a network.

A resource elimination vertex represents a link or node that may be eliminated if the vertex is selected, or a link or node that may be added if the vertex is not selected. Each resource elimination vertex is coupled to vertices representing paths that include the resource. "Each" means all of at least a subset of the identified items. The representation may also represent tandem nodes of a network, and working and protection paths of a network.

Maximum independent set module 120 determines a maximum independent set of vertices of the path conflict graph representation. The maximum independent set represents optimized paths that can be included in a network while satisfying the demands of the network. A network module 122 derives a network from the maximum independent set of path conflict graph representation. Paths represented by vertices that are members of the maximum independent set are included in the network. Links that are represented by link elimination vertices that are members of the maximum independent set are eliminated from the network. An output 124 provides the design for the network. Output 124 may be, for example, a video display, a printer, a port, or any other suitable device for providing the network design. The operations of system 100 may be carried out by any suitable combination of hardware and/or software and by any suitable combination of computers.

Figure 2:
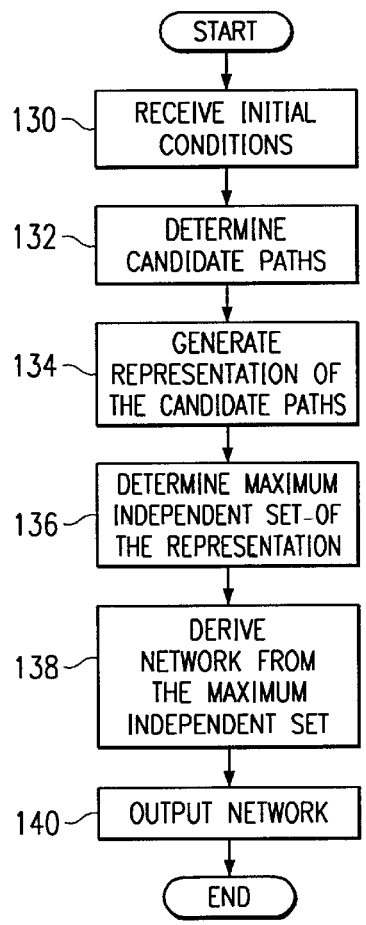
FIG. 2 is a flowchart illustrating one embodiment of a method for designing a network according to the present invention that may be used with the system of FIG. 1.

FIG. 2 is a flowchart illustrating one embodiment of a method for designing a network that may be used with system 100 of FIG. 1. At step 130, input 112 receives initial conditions. The initial conditions may include demand links, candidate links, and existing links. At step 132, candidate path module 116 determines the candidate paths from the initial conditions. As previously described, candidate paths satisfy the demand links.

Proceeding to step 134, representation module 118 generates a representation of the candidate network from the candidate paths and links. The representation may have single or multiple layers. In the representation, vertices represent candidate paths, and edges couple the vertices. An edge may couple two vertices, or an edge such as a hyperedge may couple more than two vertices. At step 136, maximum independent set module 120 determines a maximum independent set of the vertices of the representation. The maximum independent set represents optimized paths that can be included in a network while satisfying the demands of the network. At step 138, network module 122 derives a network from the maximum independent set. At step 140, output 124 provides the design for constructing and/or updating a network that satisfies the network demands. After presenting the design, the method terminates.

Thus, the system and method efficiently design an optimized network by generating a representation that includes the demands of the network. The system and method select an optimized network that satisfies network demands while using minimal node and link resources.

Figure 3:
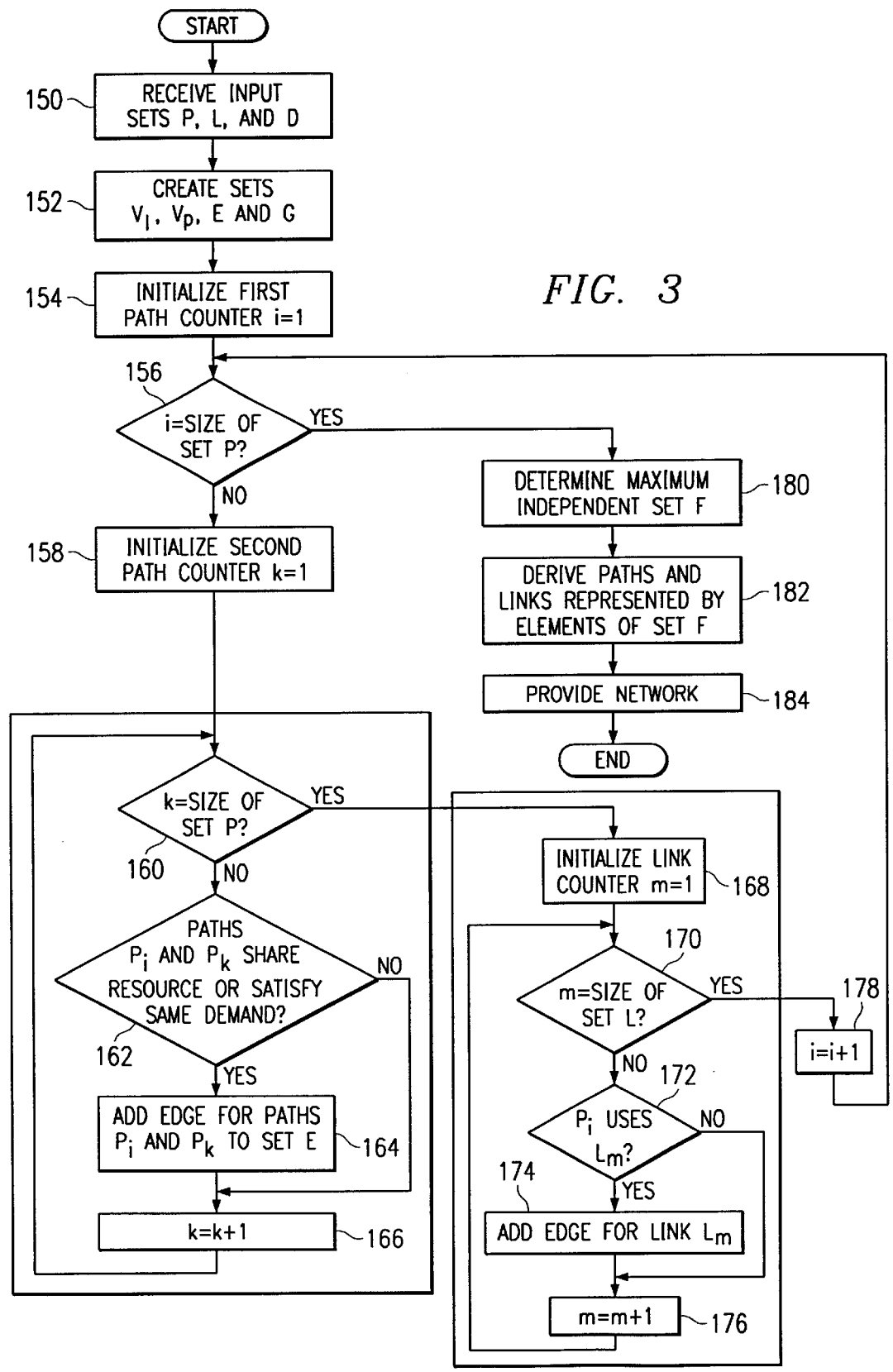
FIG. 3 is a detailed flowchart illustrating one embodiment for performing the method of FIG. 2.

FIG. 3 is a detailed flowchart of one embodiment for performing the method of FIG. 2. The method begins at step 150, where input sets P, L, and D are received. Set P includes candidate paths for the network, set L includes the candidate links, and set D includes the demand links. In this example, candidate links and candidate paths are placed in separate sets. Alternatively, candidate links and paths may be placed together in a set of candidate paths. At step 152, sets $V_l$, $V_p$, E, and G are created. Set $V_p$ includes vertices $v_p$ that represent the candidate paths of set P, and set $V_l$ includes the vertices $v_l$ that represent the links of set L. Sets $V_l$ and $V_p$ are expressed by Equation (1)

$$V_p = \{v_p : v_p = g(p), p \in P\}$$
$$V_l = \{v_l : v_l = f(l), l \in L\} \quad (1)$$

where functions f(p) and g(l) are 1-to-1 functions. Set E includes edges coupling the vertices, and is initialized at E={ }. Set G represents the path conflict graph of the links of set L and the paths of set P. Set G includes vertices and edges, and is represented by Equation (2):

$$G = \{V_l \cup V_p, E\} \quad (2)$$

Steps 154 through 166 compare a first path $P_i$ and a second path $P_k$ to determine whether the paths share a resource or satisfy the same demand. At step 154, a first path counter i is initialized. At step 156, it is determined whether the first path counter i is equal to the size of set P. If the first path counter i is not the size of set P, the method proceeds to step 158, where a second path counter k is initialized. At step 160, it is determined whether the second path counter k is the size of set P. If the second path counter k is not the size of set P, the method proceeds to step 162, where it is determined whether paths $P_i$ and $P_k$ share the same resource or satisfy the same demand. If paths $P_i$ and $P_k$ share the same resource or satisfy the same demand, the method moves to step 164, where an edge for paths $P_i$ and $P_k$ is added to set E, as described by Equation (3):

$$E = E \cup (f(P_i), f(P_k)) \quad (3)$$

At step 166, second path counter k is incremented. If paths $P_i$ and $P_k$ do not share any resource or satisfy the same demand at step 162, the method proceeds to step 166, where the second path counter k is incremented.

If at step 160, the second path counter k is equal to the size of set P, that is, path $P_i$ has been compared with the paths $P_k$ of set P, the method proceeds to step 168, where link counter m is initialized. Steps 170 through 176 determine whether path $P_i$ uses link $L_m$ and adds an edge for a link elimination vertex for link $L_m$ if path $P_i$ uses link $L_m$. At step 170, it is determined whether link counter m is equal to the size of set L. If link counter m is not equal to the size of set L, the method proceeds to step 172, where it is determined whether path $P_i$ uses link $L_m$. If path $P_i$ uses link $L_m$, a link elimination edge is added for link $L_m$ at step 174. At step 176, link counter m is incremented. If at step 172, path $P_l$ does not use link $L_m$, the method proceeds to step 176, where the link counter m is incremented.

If at step 170, link counter m is equal to the size of set L, that is, if path $P_i$ has been checked with all links of $L_m$ of set L, the method proceeds to step 178, where first path counter i is incremented. The method then proceeds to step 156.

If at step 156, first path counter i is equal to the size of set P, the method moves to step 180, where a maximum independent set F of the vertices $v_{ls}$ and $v_{ps}$ of sets $V_l$ and $V_p$, respectively, is determined. At step 182, sets $L_s$ and $P_s$ of paths represented by the vertices of set F are derived. Sets $L_s$ and $P_s$ are derived using Equation (4):

$$L_s = \{l_s : l^s = f^{-1} v_{ls}, v_{ls} \in F\}$$

$$P_s = \{p_s : p_s = g^{-1} v_{ps}, v_{ps} \in F\} \quad (4)$$

At step 184, a design for a network is provided. The network includes sets $L_s$ and $P_s$. After providing the design, the method terminates.

Figure 4A:
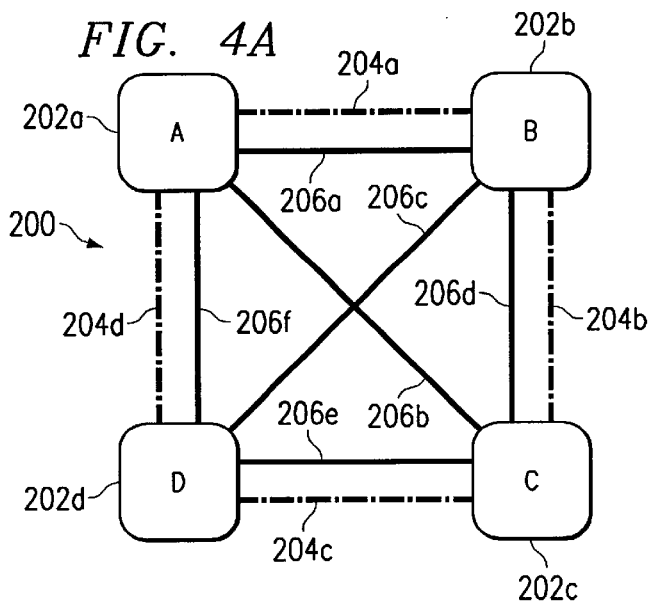
FIG. 4A illustrates one embodiment of a candidate network with initial links from which a network may be designed in accordance with the present invention.

FIG. 4A illustrates one embodiment of a candidate network 200 from which a network may be designed in accordance with the present invention. Candidate network includes nodes A 202a, B 202b, C 202c, and D 202d and links 204 and 206. Initial conditions specify the placement of nodes 202. Nodes 202 may be located at, for example, major metropolitan areas. Links 204 and 206 couple nodes 202, for example, link 204a couples nodes A 202a and B 202b. A link 204 or 206 is denoted by letters in parentheses representing the nodes that the link couples, for example, link 204a is denoted as (A,B).

Initial conditions specify demand links 204, which designate desired data traffic. For example, a network is required to send data between nodes A 202a and B 202b, between nodes B 202b and C 202c, between node C 202c and D 202d, and between nodes D 202d and A 202a, which is designated by demand links 204. Initial conditions also specify routing links 206, which may be fixed or candidate links. A fixed link is fixed and cannot be removed, for example, an existing link. A candidate link is a link that can be added, perhaps at a cost. Both fixed and candidate links are associated with wavelength sets that the link can accommodate. The set may be expressed as a set of wavelength grids given in the International Telecommunication Union-Telecommunications (ITU-T) standards.

Figure 4B:
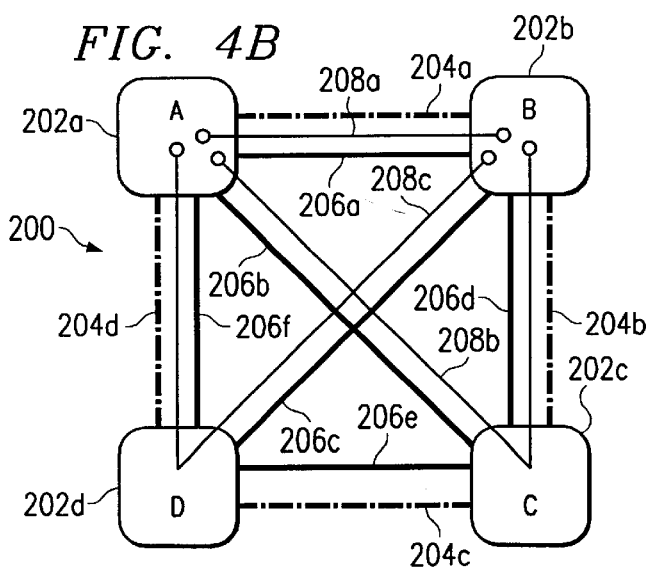
FIG. 4B illustrates candidate paths for the candidate network of FIG. 4A.

FIG. 4B illustrates candidate paths 208 for candidate network 200 of FIG. 4A. Paths 208 are routes on which data travels from one end node 202 through one or more links 204 to another end node 202, optionally through intervening nodes 202. Paths 208 are designated by a sequence of letters representing the nodes through which the path travels. For example, "ACB" designates path 208b that goes from node A 202a through node C 202c to node B 202b. Paths 208 include links 206. For example, path AB 208a includes link (A,B) 206a, and path ACB 208b includes links (A,C) 206b and (B,C) 206d.

Candidate paths 208 are used to satisfy demand links 204, and a candidate path 208 may satisfy more than one demand link 204. Candidate paths 208 may be included in the initial conditions, or may be determined from demand links 204 and restrictions on the maximum number of links for a candidate path 208. For example, demand links 204 may be accommodated by the following candidate paths 208:

(A,B)→AB, ACB, ADB
(A,C)→AC, ABC, ADC
(B,D)→BD, BAD, BCD
(C,D)→CD, CAD, CBD

For simplicity, only the paths 208 between node A 202a and node B 202b are shown in FIG. 4B. Paths 208 are limited to paths with two or fewer links 204. Thus, ACDB is not considered for demand link 204a (A, B).

To design a network, a set of routing links 206 and a set of candidate paths 208 with a minimum associated cost is determined, where each demand link 204 is satisfied by a candidate path 208, and each candidate path 208 is accommodated by one or more routing links 206.

Figure 4C:
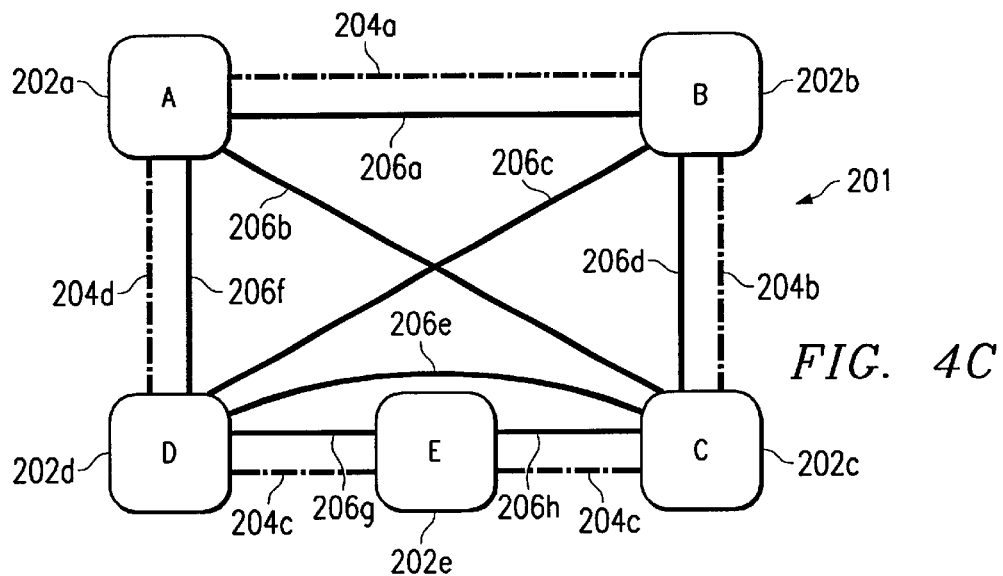
FIG. 4C illustrates one embodiment of a candidate network that introduces a tandem node into the candidate network of FIG. 4A.

FIG. 4C illustrates one embodiment of a candidate network 201 that includes a tandem node 202e. Candidate network 201 includes nodes 202 and links 204 and 206. Tandem node 202e is a node that is not an end point for a link, for example, a node without terminating equipment. For example, nodes D 202d and C 202c are the endpoints of initial link 204c, and tandem node E 202e is an intermediate node. Tandem nodes 202e may be used to decrease the length of links between nodes. Candidate paths for candidate network 201 are determined from network demands.

Figure 4D:
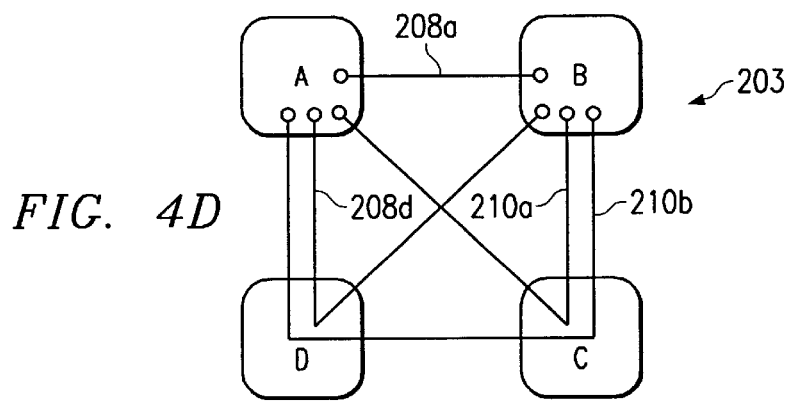
FIG. 4D illustrates one embodiment of a candidate network that introduces protection paths into the candidate network of FIG. 4A.

FIG. 4D illustrates one embodiment of a candidate network 203 that includes protection paths 210. The initial conditions for a network may include protection demands to accommodate working path failures. For example, protection path ACB 210a accommodates data traffic in case of a failure of working path AB 208a or a failure of working path ADB 208d. Similarly, protection path AB 210b accommodates data traffic in case of a failure of either working path AB 208a or working path ADB 208d. For simplicity, only selected protection paths 210 are shown. Candidate paths for candidate network 203 are determined from network demands.

Figure 5A:
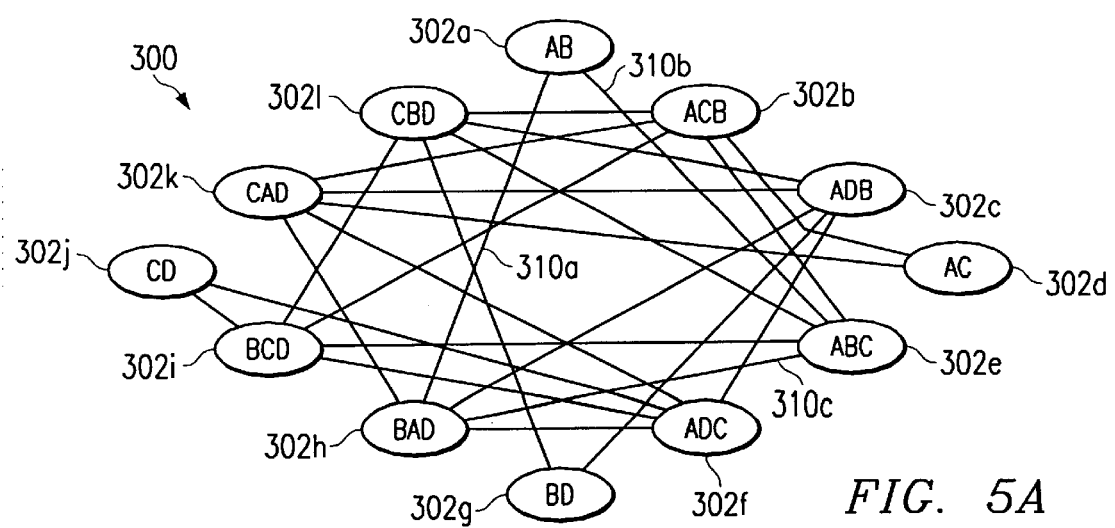
FIG. 5A illustrates a path conflict graph representing the candidate network of FIG. 4B.

FIG. 5A illustrates a path conflict graph 300 representing candidate network 200 of FIG. 4B. Path conflict graph 300 includes vertices 302 and edges 310. Each vertex 302 represents a path 208 of candidate network 200. For example, vertex 302a represents path 208a. Sets of vertices represent paths between the same end nodes, that is, paths that satisfy the same demand links. For example, vertices 302*a–c* represent paths 208*a–c* that have end nodes A 202*a* and B 202*b* and satisfy demand link 204*a*. A vertex 302 may be assigned an earning brought by satisfying a demand link 204.

Edges couple vertices 302, for example, each edge couples a pair of vertices. One type of edge, conflict edges 310, couples vertices 302 that represent paths with one or more conflicting links. For example, conflict edge 310*a* couples vertices 302*a* and 302*h* which represent paths AB and BAD. Paths AB and BAD each include link (A,B) 206*a* between nodes A 202*a* and B 202*b*. A clique is a set of vertices 302 that represent paths that include the same conflicting link. For example, vertices 302*a* 302*e*, and 302*h* represent paths AB, ABC, and BAD. Each of these paths include link (A,B) 206*a*, so vertices 302*a*, 302*e*, and 302*h* form a clique.

A set of independent vertices 302 includes vertices 302 that are not coupled by edges, for example, conflict edges 310. For example, vertices 302*a*, 302*f*, and 302*l* form a set of independent vertices, because no two vertices 302 of the set are coupled by any conflict edge 310. Vertices 302*a*, 302*c*, and 302*e*, however, do not form a set of independent vertices because conflict edge 310*b* couples vertices 302*a* and 302*e*. A set of independent vertices coupled by conflict edges 310 represents paths 208 that have no conflicting links 204 and 206, because if the vertices of the set are independent, then only one vertex is selected from each clique. For example, vertices 302*a*, 302*f*, and 302*l* represent paths ACB, ADC, and CBD, which have no conflicting links 204 or 206.

A maximum independent set is the largest set of independent vertices 302 of a path conflict graph 300. For example, for path conflict graph layer 300, vertices 302*a*, 302*d*, 302*g*, and 302*j* form a maximum independent set. A maximum independent set represents the maximum number of paths 208 of candidate network 200 having no conflicting links 204 and 206. For example, vertices 302*a*, 302*d*, 302*g*, and 302*j* represent paths AB, AC, BD, and CD, the maximum number of paths of candidate network 200 having no conflicting links 204 and 206.

Figure 5B:
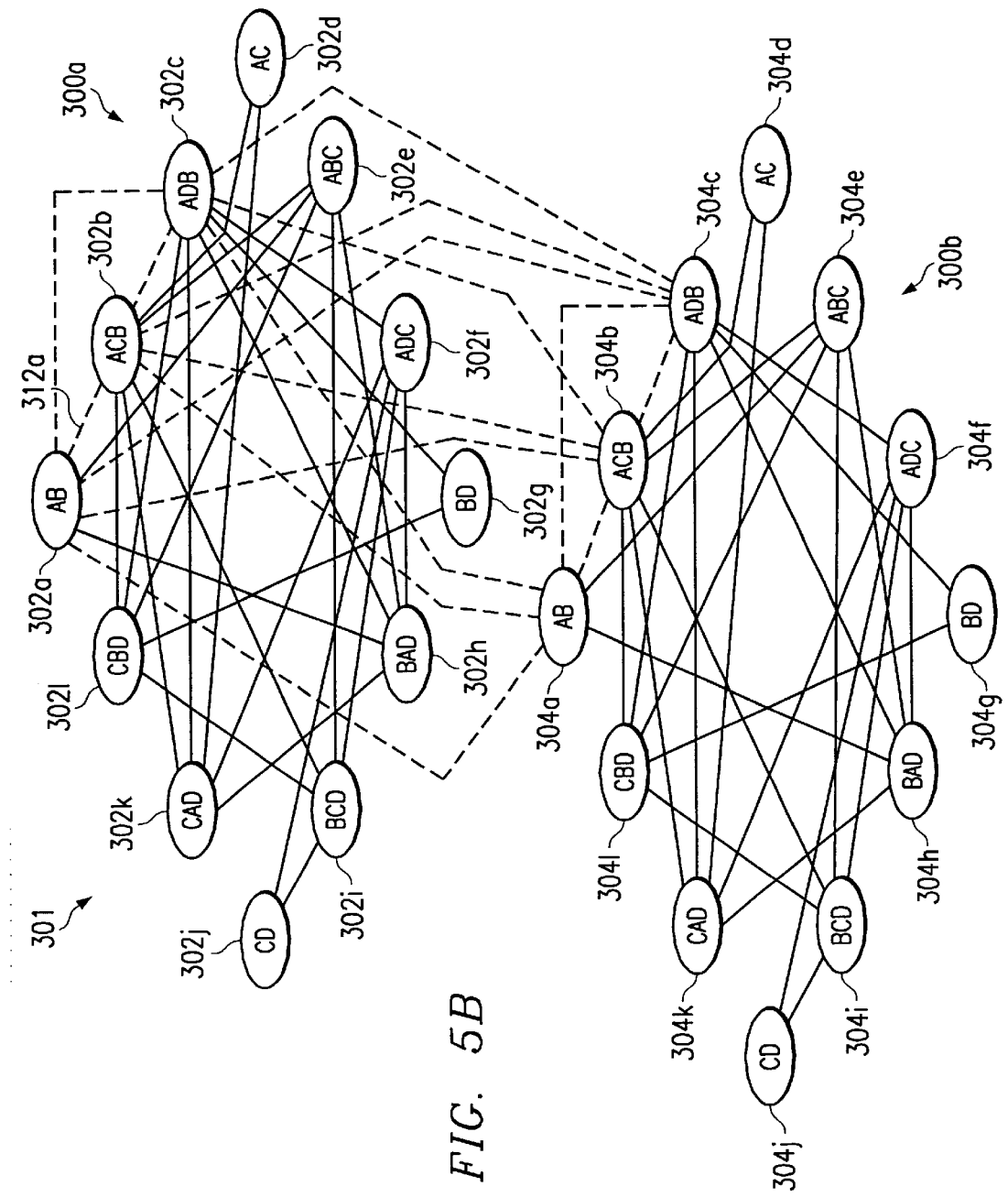
FIG. 5B illustrates a two-layer path conflict graph representing another embodiment of the candidate network of FIG. 4B having two path slots.

FIG. 5B is a two-layer path conflict graph 301 representing candidate network 200 of FIG. 4B having two path slots. A layer represents a slot available for a path. The number of slots per path is provided by the initial conditions. Path conflict graph 301 has two layers 300*a*, and 300*b*, where each is a duplicate of path conflict graph 300 of FIG. 5A, indicating that each path has two slots. More or fewer layers of vertices may be used to represent more or fewer slots per path. For example, a third layer with a vertex representing path AB may be added to path conflict graph 300 to show that path AB has three slots. Alternatively, a layer may represent a protection path 210, as described in connection with FIG. 5E.

Routing edges 312, a type of edge, couple vertices that represent paths that satisfy the same demand link 104, that is, have the same end nodes. For example, routing edge 312*a* couples vertices 302*a* and 302*b*, which represent paths AB 208*a* and ACB 208*b* with nodes A 202*a* and B 202*b* as end nodes. For simplicity, only the routing edges 312 that couple vertices 302*a–c* and 304*a–c*, which represent paths with end nodes A 202*a* and B 202*b*, are shown. An independent set of vertices coupled by routing edges 312 represent a set of paths 208 that includes at most one path for each set of end nodes.

Figure 5C:
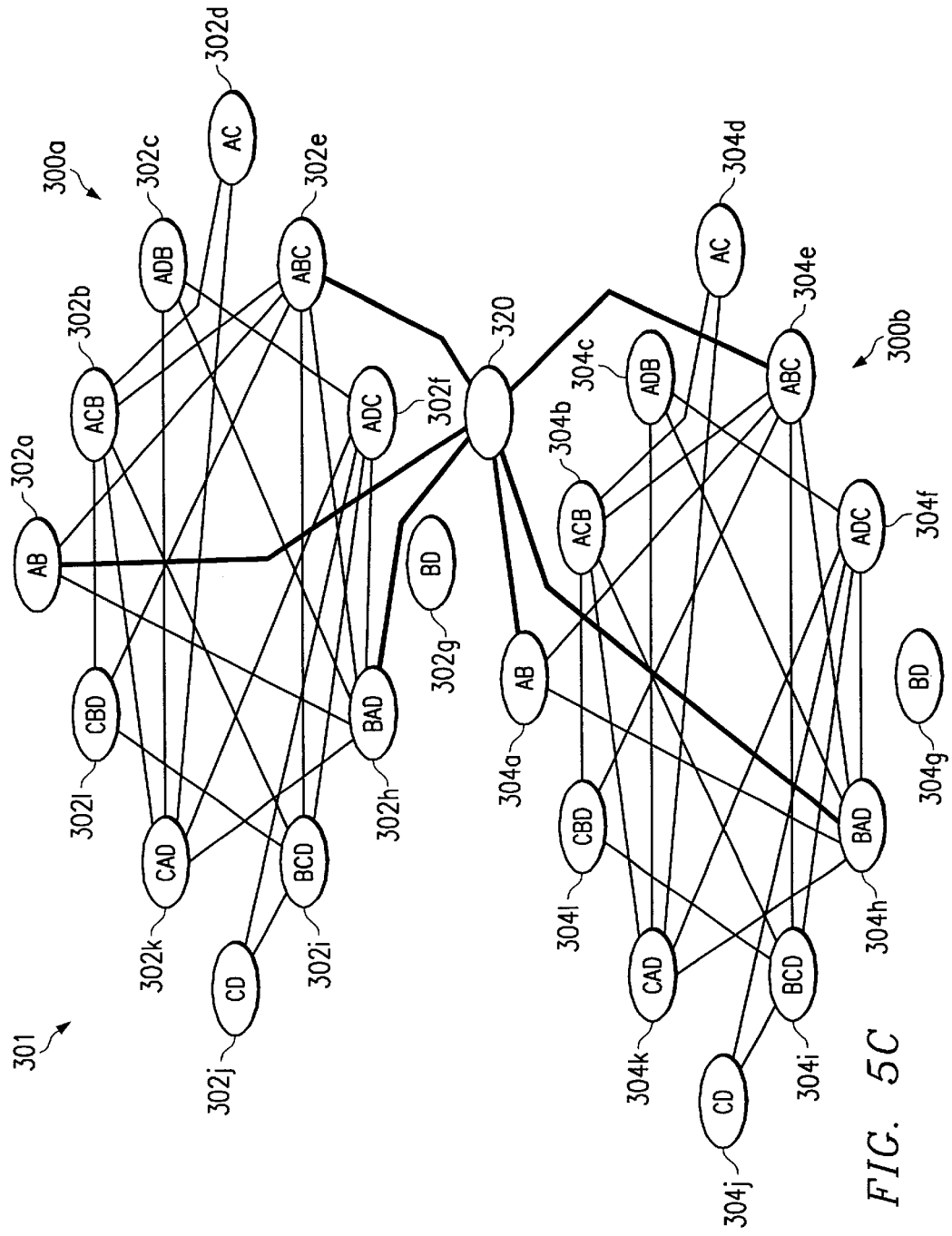
FIG. 5C illustrates the path conflict graph of FIG. 4B with a link elimination vertex.

FIG. 5C illustrates path conflict graph 300 of FIG. 4B with a link elimination vertex 320. Path conflict graph 300 may include a resource elimination vertex, which represents an eliminable resource such as candidate node 202 or candidate link 206 that may be added to an existing network. A resource elimination vertex is coupled to vertices that include the resource, as described in connection with FIGS. 4C and 4D. FIG. 5C illustrates link elimination vertex 320, and FIG. 5D illustrates a node elimination vertex.

Link elimination vertex 320 represents a candidate link (A, B) 206*a* of candidate network 200 that may be eliminated from the network if link elimination vertex 320 is selected as a member of an independent set. A link elimination vertex 320 is coupled to vertices 302 and 304 that represent paths that include the same link. For example, link elimination vertex 320 is coupled to vertices 302*a*, 302*e*, 302*h*, 304*a*, 304*e*, and 304*h*, which represent paths that include the link (A, B) 206*a*. Link elimination vertex 320 may be associated with a cost for adding the link. If link elimination vertex 320 is * selected as a member of an independent set, then no path that has link (A, B) 206*a* is also selected, indicating that the link (A, B) 206*a* is not needed. For simplicity, only one link elimination vertex is shown in FIG. 5C.

Figure 5D:
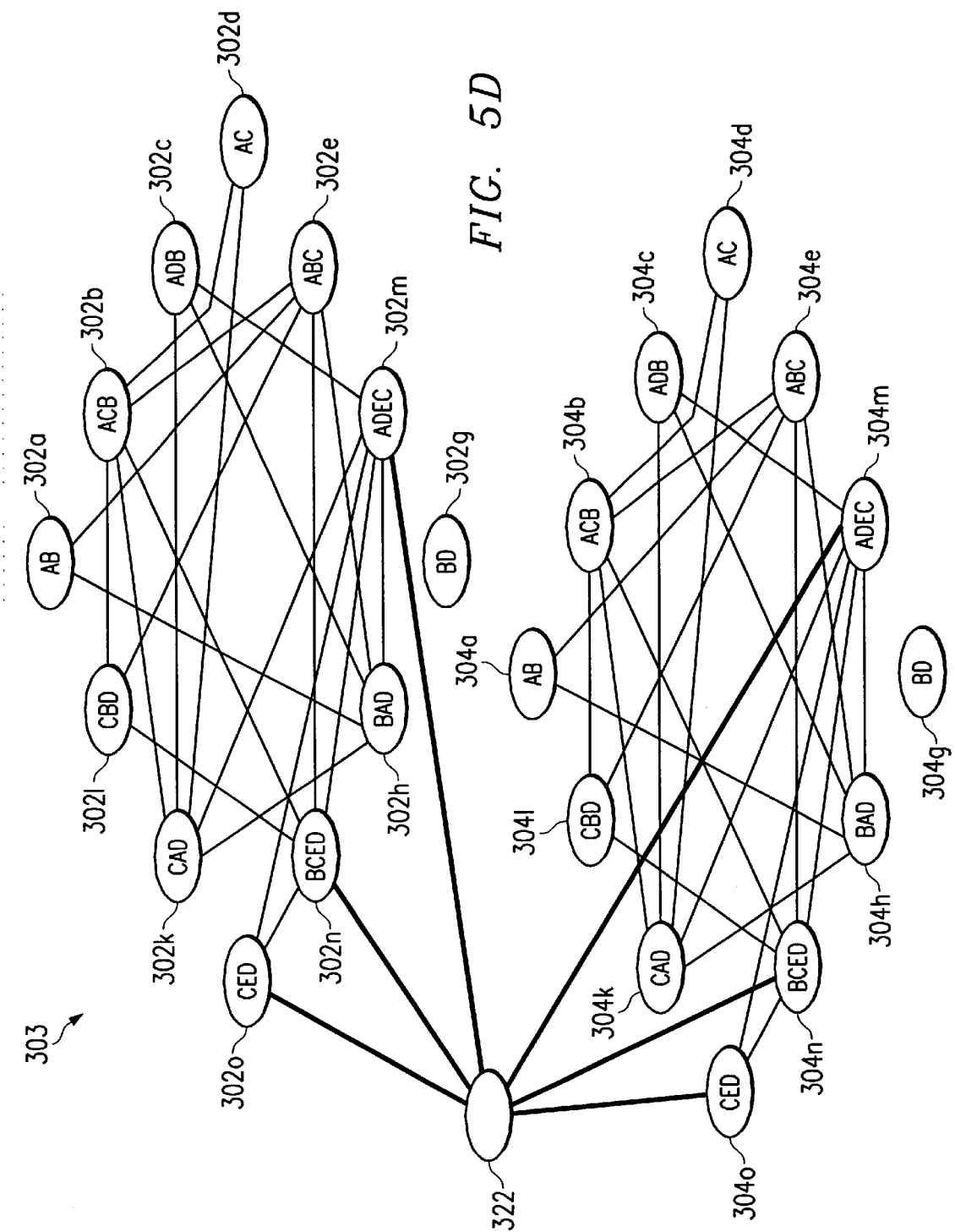
FIG. 5D illustrates a two-layer path conflict graph for the candidate network of FIG. 4C with a node elimination vertex for eliminating the tandem node.

FIG. 5D is a path conflict graph 303 for candidate network 201 of FIG. 4C with a node elimination vertex 322 for eliminating tandem node E 202*e*. Node elimination vertex 322 represents a node of candidate network 201 that may be eliminated if node elimination vertex 322 is selected as a member of a maximum independent set. Node elimination vertex 322 is coupled to vertices 302 and 304 that represent paths that include the same node. For example, node elimination vertex 322 is coupled to vertices 302*m*, 302*n*, 302*o*, 304*m*, 304*n*, and 304*o*, which represents paths that include tandem node E 202*e*. For simplicity, only one node elimination vertex 322 is shown in FIG. 5D.

Figure 5E:
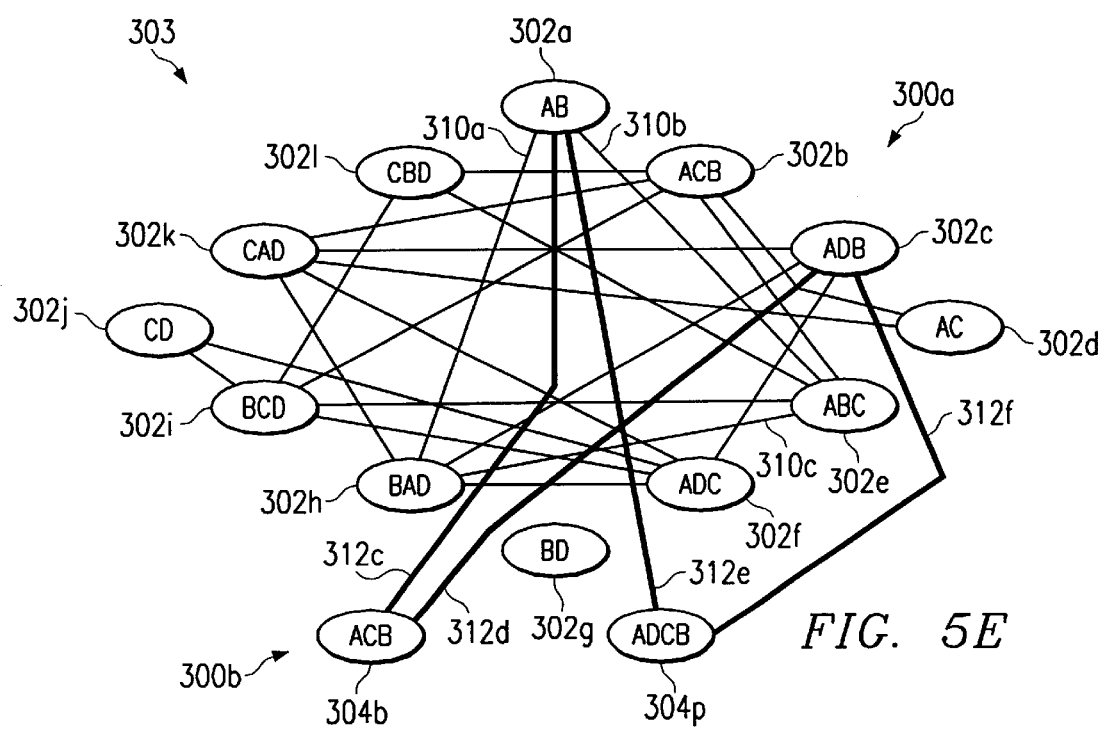
FIG. 5E illustrates a two-layer path conflict graph of the candidate network of FIG. 4D that includes representation of the protection paths.

FIG. 5E illustrates a multiple layer path conflict graph 303 of candidate network 203 of FIG. 4D having protection paths. Layer 300*a* represents working paths 208 of candidate network 203, and layer 300*b* represents protection paths 210. Vertices 304*b* and 304*p* represent protection paths 210*a* and 210*b*, respectively. Routing edges 312 couple vertices 304 representing protection paths 210 to vertices representing working paths 208 protected by protection path 210. For example, routing edges 312*c* and 312*d* couple vertex 304*b* representing protection path ACB 210*a* to vertices 302*a* and 302*b* representing the protected working paths AB 208*a* and ADB 208*d*. In one embodiment, conflict edges coupling vertices 304 representing protection paths 210 are not used to indicate that protection paths may be assigned conflicting traffic, since protection paths 210 are used only in case of a working path 208 failure.

FIG. 6 is a flowchart of a method for designing a network using candidate network 200 of FIG. 2B. The method begins at step 402, where initial conditions are provided. Initial conditions include nodes 202, demand links 204, and fixed and candidate links 204 and 206 of candidate network 200. The maximum number of slots per path and bandwidth of each link are also given. At step 406, routing links 206 are determined from the fixed and candidate links given in the initial conditions. At step 408, candidate paths 208 are generated from demand links 204 and from routing links 206 determined at step 406.

The method proceeds to steps 410 through 419, where a path conflict graph 301 is generated. At step 410, paths 208 are represented using vertices 302. At step 412, conflict edges 310 couple vertices 302 that represent paths 208 with conflicting resources such as conflicting links. Conflict edges 310 ensure that paths 208 selected using an independent set do not include conflicting resources. At step 414, layers 301 are added to represent slots accommodated by paths 208. The maximum number of slots per path is provided in the initial conditions.

At step 416, routing edges 312 are added to couple vertices 302 and 304 that represent paths that satisfy the same demand link 204. Routing edges 312 are used to ensure that at most one path 208 is selected by an independent set for each demand link 204. At step 418, link elimination vertex 320 is added to couple vertices that represent paths with a conflicting link. Link elimination vertex 320 represents a link that may be eliminated if the vertex is selected as a member of an independent set. At step 419, node elimination vertex 322 is added to couple vertices that represent paths with a conflicting node. Node elimination vertex 322 represents a node that may be eliminated if the vertex is selected as a member of an independent set.

At step 420, a maximum independent set of path conflict graph 300 is determined. The maximum independent set is determined using any suitable maximum independent set search, for example, the greedy algorithm, polynomially tractable approximation scheme, simulated annealing genetic method, or branch-and-bound find facets. The search considers any costs or earnings associated with a vertex when determining the multiple independent set. Examples of search procedures are given in Approximation Algorithms for NP-Hard Problems, Dorit S. Hochbaum, Editor.

At step 422, paths 208 are selected according to the maximum independent set. A path 208 represented by a vertex 302 or 304 of the maximum independent set is selected for the network. If a link elimination vertex 320 is a member, the link represented by vertex 320 is eliminated from the network. For example, the maximum independent set consists of vertices 302d, 302g, 302j, 304d, 304g, and 304j, which represent two slots of paths AC, BD, and CD, and link elimination vertex 320, which represents the elimination of link AB. The network includes paths AC, BD, and CD with two slots each, but does not include link (A,B).

At step 424, the network is determined from the selected paths 208 and eliminated nodes 320. The network includes links (A,C) 206b, (B,D) 206d, and (C,D) 206e 206 and nodes A 202a, B 202b, C 202c, and D 202d of the selected paths 208, but does not include the eliminated link (A,B) 206a. After determining the network, the method terminates. Thus, the method generates representation 301 of candidate network 200 and efficiently selects vertices 302 and 304 of representation 301 that are used to design a network that satisfies given initial conditions.

FIG. 7 is a flowchart illustrating one embodiment of a method for upgrading candidate network 201 of FIG. 4C. The method begins at step 502, where initial conditions are provided. The initial conditions include nodes 202 and links 204 and 206 of candidate network 200. Some nodes, for example, nodes A 202a, B 202b, C 202c, and D 202d are fixed nodes, and some nodes, for example, node E 202e are candidate nodes that may be added to upgrade a network. Links 206 include fixed links, for example, links 206d–f, and candidate links, for example, links 206a–c and 206g–h, which may be added to upgrade a network.

At step 503, candidate paths are determined, as described in more detail in connection with step 408 of FIG. 6. At step 504, path conflict graph 303 is generated for candidate network 201, as described in more detail in connection with steps 410–416. At step 506, link elimination vertices 320 are assigned to represent the elimination of candidate links 206b–c and 206g–h. The assignment of link elimination vertices 320 is described in more detail in connection with step 418 of FIG. 6. At step 507, node elimination vertices 322 are assigned to represent the elimination of candidate tandem node E 202e. The assignment of node eliminate vertices 322 is described in more detail in connection with step 419 of FIG. 6.

At step 508, a maximum independent set for path conflict graph 300 is determined, which is described in more detail in connection with step 420 of FIG. 6. At step 510, paths are selected according to the maximum independent set, which is described in more detail in connection with step 422 of FIG. 6. At step 512, candidate links that have not been eliminated by a link elimination vertex are selected to be installed in the upgrade of the network. For example, link 204a is link of a path selected at step 510, and has not been eliminated by a link elimination vertex, so link 204a is selected to be installed in an upgrade of the network.

At step 514, tandem nodes 202e that have not been eliminated by a node elimination vertex are selected to be installed to upgrade the network. For example, link elimination node 322 representing tandem node E 202e is selected as a member of the maximum independent set, so node E 202e is not selected to be installed to upgrade the network. After determining the network, the method terminates. Thus, the method generates a representation of candidate network 201 that represents fixed nodes 202 and links 204 and 206 and candidate nodes 202 and links 204 and 206. The method efficiently selects candidate nodes 202 and links 204 and 206 that may be added to a network.

FIG. 8 is a flowchart illustrating a method for including protection paths in a network from candidate network 203 of FIG. 4D. The method begins at step 602, where the initial conditions for a network are provided. The initial conditions include path protection demands. At step 604, candidate paths and slots that satisfy the protection demands are determined. Path slots and protection paths 210 may be added to satisfy protection demands, as described in FIG. 4D.

At steps 606 through 610, path conflict graph 303 of FIG. 3F is generated. At step 606, layer 300a is generated to represent working paths 208 of candidate network 203. At step 608, layer 300b is generated to represent protection paths 210. At step 610, edges 312 for protection paths 210 are added. Routing edges 312 couple vertices 304 representing protection paths 210 to vertices representing working paths 208 protected by protection paths 210. In one embodiment, conflict edges coupling vertices 304 representing protection paths 210 are not used to indicate that protection paths 210 may be assigned conflicting traffic since protection paths 210 are used only in case of a working path 208 failure.

At step 612, a maximum independent set for path conflict graph 310 is determined. At step 614, a network is determined from the maximum independent set. After determining the network, the method terminates. Thus, the method generates a network that satisfies protection demands.

Although an embodiment of the invention and its advantages are described in detail, a person skilled in the art could make various alterations, additions, and omissions without departing from the spirit and scope of the present invention as defined by the appended claims.

What is claimed is:

1. A method for designing a network, the method comprising:

generating a representation of a candidate network, the representation comprising a plurality of vertices and a plurality of edges, wherein each vertex represents a path between at least two end nodes within the candidate network and each edge couples at least two vertices representing paths of which at most one path can be included in a network;

determining a maximum independent set comprising a maximum number of vertices, wherein no two vertices are coupled by an edge; and including the paths represented by the vertices of the set in the network.

2. The method of claim 1, wherein:

each path comprises at least one of a plurality of resources; and the edges comprise a conflict edge, the conflict edge coupling at least two vertices representing paths comprising a conflicting resource.

3. The method of claim 1, further comprising conducting a maximum independent set search to determine the set.

4. The method of claim 1, wherein the network comprises an optical network.

5. The method of claim 1, wherein each path comprises at least two nodes and at least one link coupling the nodes.

6. The method of claim 5, further comprising:

receiving a demand link coupling at least two end nodes; and generating the representation, wherein the representation comprises a vertex representing a path comprising the end nodes.

7. The method of claim 5, wherein:

the vertices comprise a first vertex representing a first path and a second vertex representing a second path, each path having at least two end nodes, the first path having the same end nodes as the second path; and the edges comprise a routing edge coupling the first vertex and the second vertex.

8. The method of claim 1, further comprising:

coupling a resource elimination vertex to at least one vertex representing a path comprising an eliminable resource;

selecting the resource elimination vertex as a member of the set; and eliminating the eliminable resource from the network.

9. The method of claim 1, further comprising:

coupling a resource elimination vertex to at least one vertex representing a path comprising a candidate resource;

determining whether the resource elimination vertex is a member of the set; and including the candidate resource in the network if the resource elimination vertex is not a member of the set.

10. The method of claim 1, wherein:

the representation comprises a first layer having a first vertex and a second layer having a second vertex, the vertices comprising the first vertex and the second vertex;

the first vertex represents a first path slot of a path;

the second vertex represents a second path slot of the path; and the edges comprise a routing edge coupling the first vertex and the second vertex.

11. The method of claim 1, wherein:

the representation comprises a working layer having a first vertex and a protection layer having a second vertex, the vertices comprising the first vertex and the second vertex;

the first vertex represents a working path; and the second vertex represents a protection path, the protection path operable to transmit data in place of the working path.

12. A system for designing a network, the system comprising:

a computer-processable medium; and logic encoded in the computer-processable medium, the logic operable to:

generate a representation of a candidate network, the representation comprising a plurality of vertices and a plurality of edges, wherein each vertex represents a path between at least two end nodes within the candidate network and each edge couples at least two vertices representing paths of which at most one path can be included in a network;

determine a maximum independent set comprising a maximum number of vertices, wherein no two vertices are coupled by an edge; and include the paths represented by the vertices of the set in the network.

13. The system of claim 12, wherein:

each path comprises at least one resource; and the edges comprise a conflict edge coupling at least two vertices representing paths comprising a conflicting resource.

14. The system of claim 12, wherein the logic is operable to conduct a maximum independent set search to determine the set.

15. The system of claim 12, wherein the network includes an optical network.

16. The system of claim 12, wherein each path comprises at least two nodes and at least one link coupling the nodes.

17. The system of claim 16, wherein the logic is operable to:

receive a demand link coupling at least two end nodes; and generate the representation, wherein the representation comprises a vertex representing a path comprising the end nodes.

18. The system of claim 16, wherein:

the vertices comprise a first vertex representing a first path and a second vertex representing a second path, each path having at least two end nodes, the first path having the same end nodes as the second path; and the edges comprise a routing edge coupling the first vertex and the second vertex.

19. The system of claim 12, wherein the logic is operable to:

couple a resource elimination vertex to vertices representing paths comprising an eliminable resource;

select the resource elimination vertex as a member of the set; and eliminate the eliminable resource from the network.

20. The system of claim 12, wherein the computer is operable to:

couple a resource elimination vertex to vertices representing paths comprising a candidate resource;

determine whether the resource elimination vertex is a member of the set; and include the candidate resource if the resource elimination vertex is not a member of the set.

21. The system of claim 12, wherein:

the representation comprises a first layer having a first vertex and a second layer having a second vertex, the vertices comprising the first vertex and the second vertex;

the first vertex represents a first path slot of a path;

the second vertex represents a second path slot of the path; and the edges comprise a routing edge coupling the first vertex and the second vertex.

22. The system of claim 12, wherein:

the representation comprises a working layer having a first vertex and a protection layer having a second vertex, the vertices comprising the first vertex and the second vertex;

the first vertex represents a working path; and the second vertex represents a protection path, the protection path operable to transmit data in place of the working path.

23. A network designed according to the following:

generating a representation of a candidate network, the representation comprising a plurality of vertices and a plurality of edges, wherein each vertex represents a path between at least two end nodes within the candidate network and each edge couples at least two vertices representing paths of which at most one path can be included in a network;

determining a maximum independent set comprising a maximum number of vertices, wherein no two vertices are coupled by an edge; and including the paths represented by the vertices of the set in the network.

24. The network of claim 23, wherein:

each path comprises at least one of a plurality of resources; and the edges comprise a conflict edge, the conflict edge coupling at least two vertices representing paths comprising a conflicting resource.

25. The network of claim 23, wherein the network is designed by conducting a maximum independent set search to determine the set.

26. The network of claim 23, wherein the network comprises an optical network.

27. The network of claim 23, wherein each path comprises at least two nodes and at least one link coupling the nodes.

28. The network of claim 27, wherein the network is designed by:

receiving a demand link coupling at least two end nodes; and generating the representation, wherein the representation comprises a vertex representing a path comprising the end nodes.

29. The network of claim 27, wherein:

the vertices comprise a first vertex representing a first path and a second vertex representing a second path, each path having at least two end nodes, the first path having the same end nodes as the second path; and the edges comprise a routing edge coupling the first vertex and the second vertex.

30. The network of claim 23, wherein the network is designed by:

coupling a resource elimination vertex to at least one vertex representing a path comprising an eliminable resource;

selecting the resource elimination vertex as a member of the set; and eliminating the eliminable resource from the network.

31. The network of claim 23, wherein the network is designed by:

coupling a resource elimination vertex to at least one vertex representing a path comprising a candidate resource;

determining whether the resource elimination vertex is a member of the set; and including the candidate resource in the network if the resource elimination vertex is not a member of the set.

32. The network of claim 23, wherein:

the representation comprises a first layer having a first vertex and a second layer having a second vertex, the vertices comprising the first vertex and the second vertex;

the first vertex represents a first path slot of a path;

the second vertex represents a second path slot of the path; and the edges comprise a routing edge coupling the first vertex and the second vertex.

33. The network of claim 23, wherein:

the representation comprises a working layer having a first vertex and a protection layer having a second vertex, the vertices comprising the first vertex and the second vertex;

the first vertex represents a working path; and the second vertex represents a protection path, the protection path operable to transmit data in place of the working path.

* * * * *